United States Patent [19]

Polinski et al.

[11] 4,270,896
[45] Jun. 2, 1981

[54] CATALYST SYSTEM

[75] Inventors: Leon M. Polinski, North Plainfield; George W. Roberts, Westfield; Saul G. Hindin, Mendham, all of N.J.

[73] Assignee: Engelhard Minerals & Chemicals Corporation, Iselin, N.J.

[21] Appl. No.: 905,920

[22] Filed: May 15, 1978

Related U.S. Application Data

[62] Division of Ser. No. 607,775, Aug. 26, 1975, Pat. No. 4,089,654.

[51] Int. Cl.³ .................. F23D 13/12; B01D 50/00
[52] U.S. Cl. ................................ 431/328; 422/171
[58] Field of Search .................. 431/7, 328, 329; 422/171, 176, 191, 195, 190; 423/213.5

[56] References Cited

U.S. PATENT DOCUMENTS

| 1,452,145 | 4/1923 | Cederberg | 423/403 X |
| 2,288,943 | 7/1942 | Eastman | 422/171 |
| 2,664,340 | 12/1953 | Houdry | 423/213.5 |
| 3,220,794 | 11/1965 | Stiles | 422/171 X |
| 3,421,859 | 1/1969 | Kruggel | 431/328 X |
| 3,754,870 | 8/1973 | Carnahan et al. | 422/171 |
| 3,785,781 | 1/1974 | Hervert et al. | 422/171 |
| 3,798,005 | 3/1974 | Koch | 431/328 X |
| 3,953,176 | 4/1976 | Santala et al. | 422/171 |
| 4,072,471 | 2/1978 | Morgan, Jr. et al. | 422/171 |

FOREIGN PATENT DOCUMENTS 2304362  8/1974  Fed. Rep. of Germany ........... 422/171

Primary Examiner—Samuel Scott
Assistant Examiner—Randall L. Green

[57] ABSTRACT

A catalyst system capable of operating at very high temperatures is disclosed. The catalyst is divided into upstream and downstream portions, the upstream portion being protected against both thermal conductivity and radiant heat transfer from the downstream portion. Advantageously, the upstream portion may use a more active catalyst composition then the downstream portion.

6 Claims, 9 Drawing Figures

CATALYST SYSTEM

This is a division of application Ser. No. 607,775, filed Aug 26, 1975, now U.S. Pat. No. 4,089,654.

BACKGROUND OF THE INVENTION

The invention relates generally to catalyst systems and more particularly to catalyst configurations for catalyst systems which operate at high temperatures.

Catalyst systems are designed to operate within a prescribed operating temperature range. If the prescribed temperature range is exceeded, the catalyst activity may be destroyed or otherwise rendered ineffective. In particular, if a low ignition temperature is to be maintained at the front end or upstream portion of the catalyst, the catalytic activity at the front end is to be maintained at a substantially constant level.

In most present catalyst systems which operate essentially adiabatically, the normal operating temperature of the downstream portion of the system (the hottest part of the system) may be as high as about 815° C. or slightly higher, and catalyst compositions are available which provide both satisfactorily high activity and temperature stability at this temperature. Only the downstream portion approaches the highest temperatures because, during the steady state operation of an essentially adiabatic catalyst system supporting a typical exothermic reaction, a temperature distribution is established along the length of the catalyst, the downstream portion of the catalyst being at the highest temperature and the initial or upstream portion of the catalyst being at a lower temperature.

In combustion systems utilizing a catalyst, for example, of the kind disclosed in copending application Ser. No. 358,411, filed May 8, 1973, and entitled "Catalytically Supported Thermal Combustion", operating temperatures on the order of about 950°–1750° C. are not uncommon at the downstream portion of the catalyst. Such systems therefore utilize a catalyst composition which retains substantial amounts of catalyst activity at high temperatures. The catalyst is to maintain a low ignition temperature to be effective. However, some catalyst compositions may be relatively less active when compared to more highly active catalysts which are used at lower temperatures.

Honeycomb catalyst systems such as that described in copending application Ser. No. 358,411, may be operated so that the temperature of the upstream portion of the catalyst configuration is determined primarily by heat transfer by both thermal conduction and radiation, from the downstream portion of the catalyst. In honeycomb catalysts in particular, heat transfer due to radiation may be substantial because of line of sight paths from the downstream portion to the upstream portion. The temperature of the upstream portion under steady state conditions can be accurately estimated in accordance with the accepted principles of heat transfer by taking into account (1) the rate of heat transfer due to thermal conductivity from the downstream portion to the upstream or initial portion of the catalyst system and (2) the rate of heat transfer due to radiant heat transfer from the downstream portion of the catalyst system to the upstream portion. The rate of heat transfer due to thermal conduction is proportional to the temperature difference between the upstream and downstream portions, while the rate of heat transfer due to radiation is proportional to the difference between the downstream temperature raised to the fourth power and the upstream temperature raised to the fourth power. Thus, when the downstream temperature is very high, the temperature at the initial portion is determined primarily by radiant heat transfer, and as a result, the temperature of the initial portion of the catalyst system is higher than would be predicted by thermal conduction alone.

The very high temperatures at the downstream end of a honeycomb catalyst may be important and critical because the corresponding higher temperatures at the initial portion may restrict the use of highly active catalyst compositions at the initial portion of the catalyst system. This may be a serious problem if an active catalyst is used to advantageously provide the system with a relatively low ignition temperature. Thus, in order to maintain a low ignition temperature, catalyst activity is to be maintained. However, high temperatures at the initial portion maintained under steady state conditions may tend to deactivate the catalyst composition at the initial portion of the catalyst system, thereby causing an undesirable rise in the ignition temperature of the system for subsequent start-up.

One deactivation mechanism is a loss of base surface area, for example due to sintering of the base composition. The surface area of the base can be measured by the well known method developed by Brunauer, Emmett and Teller. Another deactivation mechanism would be the growth of metal crystallites and the corresponding loss of active metal surface area. The size of the crystallites can be measured by chemisorption, for example by measuring the amount of $H_2$ or $CO$ which is adsorbed under specified test conditions. The above test methods can also be used to provide measurements to correlate with the catalytic activity of the catalyst.

SUMMARY OF THE INVENTION

It is therefore an object of this invention to provide a catalyst system which is capable, at its downstream portion, of operating at temperatures above about 815° C. while maintaining, at the upstream portion of the system, a substantially constant low ignition temperature by preventing thermal conduction and radiant heat transfer from the downstream portion of the catalyst system to the upstream portion. Other objects of the invention include insuring greater reliability for repeated ignition of the catalyst system at low inlet temperatures and enabling lower ignition temperatures to be obtained by the use of a more active but less temperature stable catalyst composition at the initial portion of the catalyst system.

The invention features a honeycomb catalyst system which has a catalyst configuration consisting of a protected upstream portion and a downstream portion. Each honeycomb portion comprises as the support a porous unitary solid refractory skeletal structure having a plurality of unobstructed gas flow channels extending therethrough. The upstream and downstream portions are secured with respect to each other to substantially minimize thermal conductivity between the portions and to substantially reduce radiant heat transfer from the downstream portion to the protected upstream portion. A low ignition temperature can thereby be maintained at the upstream portion.

In a particular embodiment, the upstream portion is more catalytically active than the downstream portion and need not retain its catalytic activity at high temperatures as required by the downstream portion. An example of a catalyst which tends to lose its catalytic activity at high temperatures is crystalline alumino-silicate. The reduction in radiant heat transfer from the downstream to the upstream portion may be effected by configurations which tend to eliminate line of sight radiation paths from the downstream portion to the protected upstream portion. The configurations often include apparatus coated with a high reflectivity surface in order to enhance the radiation reducing character of the configuration.

BRIEF DESCRIPTION OF THE DRAWINGS

Other objects, features, and advantages of the invention will appear from the following description of several particular embodiments of the invention taken together with the attached drawings thereof in which.

DESCRIPTION OF PARTICULAR EMBODIMENTS

Figure 1:
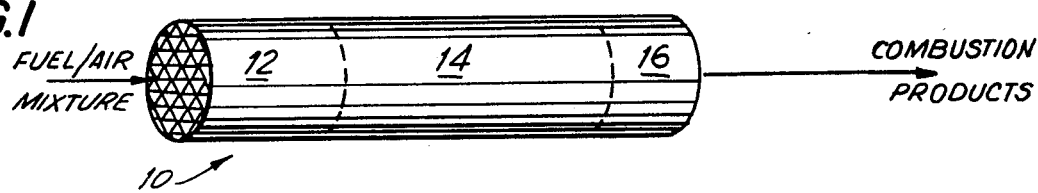
FIG. 1 is a schematic representation of an unprotected catalyst system.

Referring to FIG. 1, there is shown in schematic representation a honeycomb catalyst system 10 of the type described in the above mentioned copending application Ser. No. 358,411 whose disclosure is herein incorporated by reference in its entirety. The catalyst system may be conceptually divided into three zones which correspond to the classes of mechanisms which control the reaction (combustion) rate at the various points along the catalyst length. For simplicity, FIG. 1 shows these zones as being distinctly defined, however in reality, the boundaries between the zones are diffuse, and in addition the proportions of the zones are exaggerated for illustrative purposes.

While the mechanism of honeycomb catalyst operation forms no part of the present invention, it is believed that the catalyst system of FIG. 1 operates as follows. When the honeycomb catalyst system 10 is presented with a fuel/air mixture at a temperature only slightly above the ignition temperature of the particular catalyst composition being used, the reaction rate in an initial portion 12 of the catalyst system will be slow, and will be controlled by intrinsic catalytic kinetics. In the initial portion 12, differences in temperature and species concentration between the honeycomb catalyst walls and the bulk fluid flowing through the honeycomb channels are relatively small. In particular, for an exothermic reaction such as combustion, the wall temperature is equal to or only moderately greater than the bulk fluid temperature.

As the gas passes through the initial portion of catalytic system 10 operating at steady state, the bulk fluid temperature increases due to absorption of the heat of reaction. Since the intrinsic chemical reaction rate increases exponentially with temperature, this rate soon exceeds the rate at which the reactants can be transported to the honeycomb catalyst walls and under this circumstance, the reaction becomes controlled by the rate at which the reactants are convectively or diffusively transferred to the surface of the catalyst. This occurs in a second portion 14 of the catalyst system, where the rate of masstransfer to the catalyst wall surface determines the overall reaction rate. (If the inlet temperature of the fuel/air mixture is sufficiently high, the initial portion may not exist at all, and the "second portion" will be the first zone in the catalyst system.) In the second portion, the temperature of the honeycomb catalyst wall can greatly exceed the bulk fluid temperature and in fact can approximate the adiabatic flame temperature of the inlet fuel/air mixture.

As the bulk gas temperature increases further in passing through the second portion 14, a temperature will eventually be reached where the rate of the homogeneous or thermal combustion reaction becomes significant. For methane fuel, for example, this temperature corresponds to about 1000° C. Beyond this approximate temperature, within the catalyst, the heterogeneous and homogeneous reactions proceed simultaneously. This occurs in a third portion 16 of the catalytic system. In the third portion, the catalyst wall temperature continues to approximate the adiabatic flame temperature, while the gas temperature in the interior of the honeycomb catalyst passageways becomes increasingly high until it also may approach the adiabatic flame temperature.

In a typical catalyst system, operating as described above, the catalyst temperature in the initial portion 12, while initially relatively low and approximately equal to the temperature of the incoming air/fuel mixture, will, as the catalyst system reaction reaches a steady state condition, increase and tend to approach the temperature of the downstream portions of the catalyst. The phenomenon results, as noted above, from thermal conduction along the catalyst and catalyst support walls and from radiant heat transfer from the hotter downstream portions of the catalyst to the upstream portions. Thus, initial zone 12 tends to reach a relatively high temperature during steady state operation of the catalytic combustor system.

Referring to FIGS. 2-6, there are shown particular embodiments of the invention in which an upstream portion 20 of the catalyst system is protected from the hotter downstream portion 26 of the catalyst system. Protected upstream portion 20 will include all or a part of initial portion 12 and may also include a part of second portion 14. (If there is no initial portion 12, protected upstream portion 20 will include only a part of second portion 14.) Protection against thermal conduction is achieved, for example, by physically separating the protected upstream portion 20 of a catalyst system from the downstream portion of the catayst system. Protection against radiant heat transfer from the downstream portion of the catalyst system to the protected upstream portion can be achieved in many ways, for example, with reflective shields to prevent line of sight radiation from the downstream portion to the upstream portion. In this way, not only is the upstream portion of the catalyst protected against excessive temperatures but unique advantages are realized, for example, the ability to construct the two portions of the catalyst system from different catalyst compositions and/or from different catalyst substrates in order to obtain and maintain a low ignition temperature and to maximize the efficiency and operation of the catalyst system at minimum cost.

Figure 2:
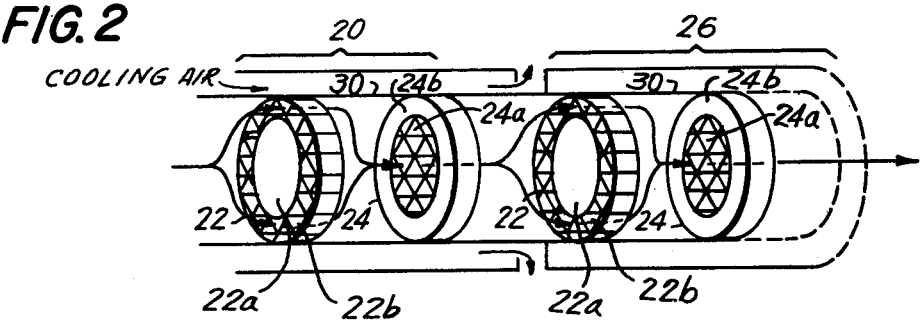
FIG. 2-6 are schematic representations of particular embodiments of a protected catalyst system according to the invention.

Referring now to FIG. 2, there is shown schematically a catalyst system having a configuration which incorporates alternating disc-like shaped 2 and doughnut-like shaped 24 catalyst sections. The disc-like shaped sections 22 consist of a closed off cylindrical portion 22a surrounded by an annular ring of honeycomb material 22b. The doughnut-like shaped sections 24 consist of a honeycomb central portion 24a surrounded by a closed off annular portion 24b. Sections 22 and 24 are shown with and preferably have their longitudinal axes parallel and aligned. Preferably, the closed off portions of the sections are coated with a reflecting material on the side facing the downstream portion. The alternating disc and doughnut shaped sections force the air/fuel mixture into an alternating radially inward and radially outward flow pattern between the catalyst sections. The forced radial flow induced by the alternating disc and doughnut shaped catalyst elements helps transfer heat to an outside wall 30 of the catalyst configuration. Advantageously, as shown in FIG. 2, the outside wall 30 of the catalyst system in the upstream portion (forming the peripheral cylindrical interface between the upstream portion and its environment) is cooled to further reduce the temperature in the protected upstream portion. When means are provided to direct a flowing gas to cool the upstream portion, the gas can afterwards be advantageously combined with exit gases of the catalyst. The physical separation between the catalyst sections and the elimination of a direct line of sight between the downstream portion 26 and the upstream portion 20 reduce thermal conductivity and radiant heat transfer from the downstream portion to the protected upstream portion and provide a cooler upstream portion than would otherwise be available.

Figure 3A:
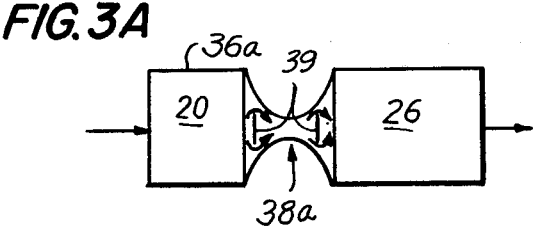
Figure 3C:
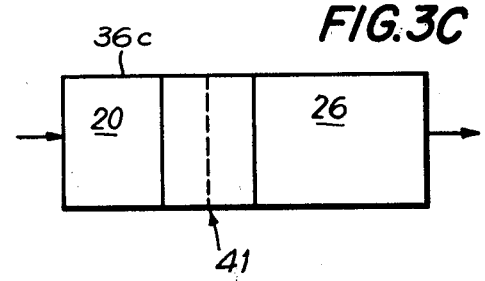
Figure 3B:
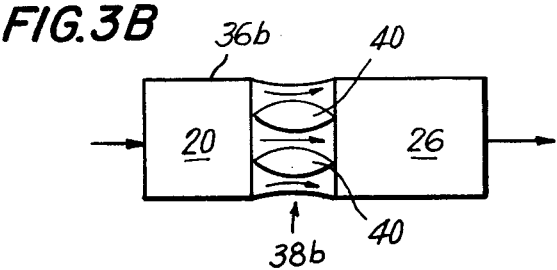
Figure 3D:
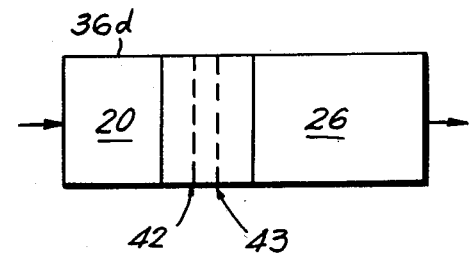

As shown in FIGS. 3A, 3B, 3C, and 3D, various kinds of constricted passages may be used between the protected upstream portion 20 and the downstream portion 26 of the catalyst system to reduce radiant heat transfer as well as thermal conduction from the downstream portion to the upstream portion. Upstream portion 20 is shown in FIGS. 3A, 3B, 3C, and 3D, having its longitudinal axis parallel to and preferably aligned with the longitudinal axis of downstream portion 26. Referring to FIG. 3A, an outer peripheral wall 36a of the catalyst system is constricted at 38a, and baffles 39, each of which has preferably been coated on its downstream side with a reflecting material, are provided to further reduce radiant heat transfer. In FIG. 3B, an outer peripheral wall 36a is constricted at 38b and restrictive baffles 40, shaped like air foils, are placed in the path of the gases between the protected upstream portion and the downstream portion. Baffles 40 effectively reduce radiant heat transfer from the downstream portion 26 to the upstream portion 20.

Referring to FIG. 3C, the upstream and downstream portions of the catalyst system are spaced apart with their longitudinal axes parallel and aligned. An outer peripheral wall 36c of the catalyst system encloses the portions 20, 26 and has a constant cross-sectional shape. A thin plate 41 is placed normal to the longitudinal axes of the upstream and downstream portions of the catalyst system in order to restrict radiant heat transfer from the downstream portion of the catalyst system to the protected upstream portion. Preferably, the plate 41 has less than fifty percent open area and its downstream side is coated with a reflective material. As a result, heat transfer from the downstream portion is effectively reduced allowing the upstream portion of the catalyst system to operate at relatively lower temperature In FIG. 3D there is shown an advantageous modification of the catalyst system described in connection with FIG. 3C. In the catalyst system of FIG. 3D, two thin plates 42, 43 are placed normal to the longitudinal axes of the upstream and downstream portions 20, 26 of the catalyst system. More than two plates may be used. Each plate has significant open area (preferably less than fifty per cent) and is preferably coated on its downstream side with a reflective material. The plates are not aligned and preferably are arranged so that there is no direct line of sight from the downstream portion to the upstream portion. Radiant heat transfer is thereby further reduced to allow the upstream portion of the catalyst system to operate at a relatively lower temperature.

Figure 4:
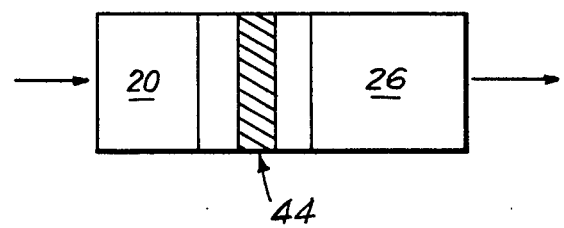

Referring to FIG. 4, a honeycomb section 44, having its channels oriented at an angle to the longitudinal axes of the upstream and downstream portions of the catalytic system, is used in place of plate 41 between portions 20 and 26 of FIG. 3C. The channels of honeycomb section 44 are preferably coated with a material to effect either absorption or diffuse or white reflection depending upon the specific operating conditions. Thus, for example, absorption is preferred where the thermal conductivity of the slanted honeycomb section 44 is relatively low and the flow through the slanted honeycomb channels is sufficiently high so that the coefficient of heat transfer between the gas and the channel walls is relatively high. Conversely white reflection is preferred where the thermal conductivity of the slanted section is relatively high and the coefficient of heat transfer between the gas and the walls is relatively low. In either case, radiant heat transfer and hence the temperature of the upstream portion of the catalyst system is reduced. The channel opening and the angle of the channels of honeycomb section 44 with respect to the face of the catalyst are each preferably small enough that there is no direct line of sight between the upstream and downstream portions.

Figure 5:
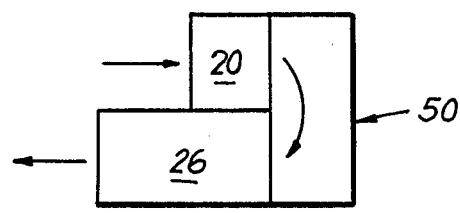
Figure 6:
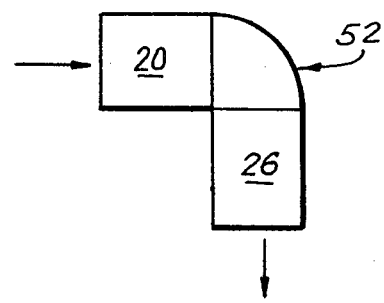

In each of the catalyst systems shown schematically in FIGS. 2-4, the longitudinal axes of the upstream and downstream portions of the catalyst have been parallel and aligned. This need not always be the case. Referring to FIGS. 5 and 6, FIG. 5 shows a catalyst system in which the longitudinal axis of the protected upstream portion is oriented 180° away from (or in the opposite direction from) the longitudinal axis of the downstream portion. In addition to the reduction in heat transfer between the portions 20 and 26 resulting from the physical separation of portions 20, 26, thermal conduction and radiant heat transfer are further reduced by using an enclosing wall 50 having low reflectivity, low, conductivity properties. Referring to FIG. 6, the longitudinal axes of the upstream and downstream portions 20, 26 are perpendicular to one another. This physical configuration reduces radiant heat transfer and thermal conductivity between the two portions 20, 26 of the catalyst system. Additionally, the temperature of the protected upstream portion 20 is preferably further reduced by using an enclosing wall 52 having low reflectivity and low thermal conductivity properties. In this way a low ignition temperature can be maintained at the protected upstream portion.

Separating the catalyst system into the upstream and downstream portions offers several distinct advantages. For example, it enables the use of different catalyst compositions in each of the catalyst portions; this is particularly advantageous at the protected upstream portion where a low ignition point is desirable. Also, a less expensive catalyst composition can be used in the higher temperature downstream portion. For example, a highly-active but thermally-less-stable catalyst composition can be used in the protected upstream portion while a less active catalyst composition is used downstream. Thus, according to the invention, mordenite and other molecular sieves, which lose their surface area at 850° to 1000° C., but which are highly desirable supports for very active catalysts at temperatures lower than their thermal decomposition temperatures, can be used in the protected upstream portion of a typical catalyst system in which the downstream portion may be operating at, for example, 1500° C. The downstream portion, on the other hand, may require a slip with greater resistance to thermal sintering, such as chromia-alumina-ceria as a base for deposition of an active metal oxidation catalyst. Alternatively, the downstream portion may not require any slip at all, where, for example, an active metal may be deposited directly on a thermally-stable honeycomb by decomposition of an organo metallic compound.

EXAMPLE 1

A catalyst system having a configuration similar to that shown schematically in FIG. 4 can be constructed by the following steps.

Step 1

The protected upstream portion 20 can be made as follows. A zircon-mullite honeycomb cylinder, 1" in diameter by 3" long and having 12 corrugations per inch, is impregnated with a catalytic base consisting of an aqueous suspension of 12% $CeO_2$—88% $Al_2O_3$ particles in the 4 micron size range. The coated honeycomb is dried at 110° C. and then calcined at 600° C. The surface area of the base is greater than 100 $m^2$/gm. The base content was 22.5% by weight.

The base-coated honeycomb cylinder is then immersed in a 25% $Na_2PdCl_4$ solution for 15 minutes. The solution is then blown off lightly with air. The honeycomb is then immersed into a slightly basic solution for one hour, rinsed with water and dried at 110° C. The cylinder is then calcined at 500° C.

A second impregnation of the cylinder is made with another 25% solution of $Na_2PdCl_4$ for 15 minutes. The honeycomb cylinder is then removed from the solution, blown off, and is immersed in a slightly basic medium for one hour. The cylinder is placed in a water bath for 15 minutes and is then washed chloride free and dried at 110° C. for 2 hours. On cooling the cylinder is found to contain 2.6 wt.% total palladium.

Step 2

Honeycomb section 44 can be constructed from a ¼" thick, 5 corrugation per inch zircon-mullite honeycomb with channels slanted at a 30° angle from the face of the honeycomb block. A 50/50 vol/vol mixture Hanovia "type N" liquid gold (11% Au by weight) plus chloroform is impregnated on the slanted honeycomb section by dipping. The gold "liquid" is burned off at 600°–760° C.

The honeycomb section is redipped in the 50/50 l mixture and recalcined several more times until either a bright reflective luster or a dull yellow gold hue is observed on the honeycomb channel walls.

Step 3

The downstream portion 26 of the catalyst system can be constructed from a 5 corrugation per inch zircon-mullite honeycomb prepared as follows. A refractory base consisting of $Cr_2O_3/Al_2O_3/CeO_2$ (14%/70%/16%) is calcined at 1000° C. for four hours. It is then ground to forty mesh powder having surface area of 50 sq.m./gm. The powder is then ball milled with palladium nitrate in water, forming a ground aqueous slurry having a 2–3 micron average particle size. The 5 corrugation per inch zircon-mullite honeycomb is dipped in this aqueous slurry, blown off with air, dried at 110° C., and is then calcined at 500° C. for two hours. The base content of this honeycomb catalyst preparation is 22.7% by weight and the palladium content of the honeycomb is 0.38% by weight.

Step 4

A catalyst system corresponding to that shown schematically in FIG. 4 is constructed with the elements of steps 1–3 as follows: (a) a 1" diameter by ½" long slice of the 1" diameter by 3" long element of step 1 is inserted into a tube as the protected upstream portion 20 of the catalyst system; (b) the slanted, gold-coated reflector prepared in step 2 is inserted in the center of the tube; and (c) 1" diameter by 2" slice of the catalyst element of step 3 is placed downstream of the reflector and constitutes the downstream portion 26.

The catalyst system constructed above was subjected to a catalytic combustion reaction using a methane-air system (42,000 ppm. $CH_4$ in air) which traversed the catalyst at a space velocity of 100,000 volumes (STP) of gas/hr/volume of catalyst. The reactants were ignited and almost immediately the temperature of the exit gases rose to a level at which homogeneous combustion occurred at a significant rate. Exit temperatures were kept at greater than 1000° C. for at least one hour between ignitions.

The record of ignition temperature as a function of number of ignitions is given in Table I. Burning was smooth and stable.

TABLE I

| Ignition Number | 1st | 2nd | 3rd | 4th | 5th | 6th |
|---|---|---|---|---|---|---|
| Ignition temperature | 270° C. | 335° C. | 335° C. | 332° C. | 322° C. | 317° C. |

*The ignition temperature is that minimum temperature required to produce measurable temperature rise across the catalyst.

EXAMPLE 2

An unprotected palladium catalyst was prepared by double impregnation of a 25% $Na_2PdCl_4$ solution on a base of the type used in the downstream portion of the protected catalyst system ($Cr_2O_3/Al_2O_3/CeO_2$) (Example 1, Step 3). A total of 10.5 wt. % of the base was deposited on a 12 corrugation per inch, zircon-mullite honeycomb support. The honeycomb support is a cylinder 1" in diameter by 3" long. The final catalyst had an average palladium content of 1.76% Pd by weight (compared to the 0.824% for the protected catalyst).

The unprotected catalyst system was subjected to the same catalytic combustion reaction as the protected system using a methane-air system (42,000 ppm. $CH_4$ in air) and was carried out at the same space velocity of 100,000 volumes (STP) of gas/hr./vol. of catalyst. Table II shows the ignition history of this catalyst on successive burnings, each of which involved having the exit gases reach temperatures of greater than 1000° C. Burning was erratic and unstable with fluctuating exit temperatures.

TABLE II

| Ignition Number | 1st | 2nd | 3rd | 4th |
|---|---|---|---|---|
| Ignition Temperature* | 300° C. | 370° C. | 370° C. | 390° C. |

*The ignition temperature is that minimum temperature required to produce measurable temperature rise across the catalyst.

In comparison, the thermally-protected catalytic combustor system provides the temperature stability necessary to prevent increases in ignition temperature with successive burnings which is indicative of lowering catalytic activity.

Other embodiments will occur to those skilled in the art and are within the following claims:

What is claimed is:

1. A method for maintaining substantially constant low ignition temperature start-up combustion characteristics in a catalytically supported thermal combustion system operating essentially adiabatically at downstream temperatures above about 815° C., comprising effecting combustion by contacting a vaporous fuel and air mixture upstream and downstream in said combustion system with a catalyst system comprising:

(a) a catalyst configuration consisting of at least a downstream honeycomb catalyst portion and an upstream honeycomb catalyst portion protected therefrom, each honeycomb portion comprising as support a porous unitary solid refractory skeletal structure having upstream and downstream faces and having a plurality of unobstructed gas flow channels extending therethrough;

(b) means to secure said upstream and downstream portions substantially free of continuous thermal conduction paths through solid material between the upstream face of said downstream portion and the downstream face of said upstream portion to substantially minimize thermal conduction between said portions; and (c) means positioned with respect to said upstream and downstream portions to substantially reduce radiant heat transfer from said downstream portion to said protected upstream portion; said upstream portion being adapted and allowed to operate at relatively substantially lower temperatures than is said downstream portion by said means to minimize thermal conduction therebetween and by said means to reduce radiant heat transfer therebetween; said upstream portion being formulated to have a higher catalytic activity than does said downstream portion but to be thermally less stable if heated substantially above said relatively lower temperatures.

2. A method as defined in claim 1 wherein the upstream catalyst portion is protected at least in part by a radiant energy reflector adapted to reflect radiant energy from the downstream portion back to the downstream portion.

3. A method as defined in claim 1, wherein the upstream catalyst portion is formulated to retain a smaller proportion of its virgin catalytic activity after aging at an elevated combustion temperature than does said downstream catalyst portion.

4. A method as defined in claim 1 wherein the upstream and downstream portions are connected by a constricted flow path, the flow path having a smaller open area than the cross-sectional area of either portion.

5. A method as defined in claim 1 wherein the upstream and downstream portions are separated by a honeycomb section having channels oriented at an angle to the channels of said upstream and downstream portions.

6. A method as defined in claim 1 wherein the catalyst includes a plurality of axially aligned honeycomb elements having alternately closed off portions forming disc and doughnut shaped honeycomb sections for providing forced radial flow of gases passing through the catalyst.

* * * * *